United States Patent
Johns et al.

(10) Patent No.: US 7,225,277 B2
(45) Date of Patent: May 29, 2007

(54) PROXY DIRECT MEMORY ACCESS

(75) Inventors: Charles Ray Johns, Austin, TX (US);
Peichun Peter Liu, Austin, TX (US);
Thuong Quang Truong, Austin, TX (US); Asano Shigehiro, Austin, TX (US); Takeshi Yamazaki, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 579 days.

(21) Appl. No.: 10/655,370

(22) Filed: Sep. 4, 2003

(65) Prior Publication Data

US 2005/0055478 A1    Mar. 10, 2005

(51) Int. Cl.
    *G06F 13/28*    (2006.01)
(52) U.S. Cl. .......................... 710/22; 710/23
(58) Field of Classification Search .......... 710/22, 710/23
    See application file for complete search history.

(56) References Cited

U.S. PATENT DOCUMENTS 5,301,287 A * 4/1994 Herrell et al. ............... 711/202

2003/0088735 A1* 5/2003 Busser et al. ............... 711/114
2003/0126320 A1* 7/2003 Liu et al. ...................... 710/22
2004/0039835 A1* 2/2004 Glenn et al. ................ 709/231

FOREIGN PATENT DOCUMENTS

EP    1353250 A1 * 10/2003

OTHER PUBLICATIONS

Kunimatsu, Atsushi et al., "Vector Unit Architecture for Emotion Synthesis"; *IEEE Micro*; Mar.-Apr. 2000 pp. 40-47.

* cited by examiner

*Primary Examiner*—Donald Sparks
*Assistant Examiner*—David E. Martinez
(74) *Attorney, Agent, or Firm*—Carr LLP; D Ann Rifai

(57) ABSTRACT

A system and method are provided for setting up a direct memory access for a first processor. The system includes the first processor and a local memory. The local memory is coupled to the first processor. A first direct memory access controller (DMAC) is coupled to the first processor and the local memory. A system memory is in communication with the first DMAC. A second processor is in communication with the first DMAC such that the second processor sets up the first DMAC to handle data transfer between the local memory and the system memory. The second processor is interrupted when the first DMAC finishes handling the data transfer.

24 Claims, 2 Drawing Sheets

PROXY DIRECT MEMORY ACCESS

BACKGROUND OF THE INVENTION

1. Field of the Invention

The invention relates generally to a direct memory access and, more particularly, to using one processor to set up a direct memory access for another processor.

2. Description of the Related Art

In a computer system, data is transferred from one memory location to another memory location using load and store instructions or using direct memory access controller (DMAC). Load and store instructions have a very long latency. That is, a processor in the computer system should wait for a large amount of data to transfer before working on the load and store instruction. At first, data needs to be read from one memory location into a processor's registers. Then, the data will be transmitted to another memory location from the processor's registers.

DMAC provides a mechanism to move data from a memory location to another memory location without involvement of a processor. In a prior art system, the processor has to set up the DMAC before the DMAC can perform the data transfer on its own. Once the DMAC is set up, the processor can perform other tasks while the DMAC takes care of the data transfer.

A multi-processor system may have one or more special processors dedicated to important tasks and one or more general-purpose processors. In such a multi-processor system, a special processor may have its own DMAC to set up. In that case, the special processor ends up spending its valuable time on setting up the DMAC. This may adversely affect the entire performance of the multi-processor system, because the special processor cannot perform its own special tasks while it is setting up the DMAC.

Therefore, a need exists for a system and method for improving performance of a computer system by freeing particular processor(s) from the job of setting up the DMAC.

SUMMARY OF THE INVENTION

The present invention provides a system and method for setting up a direct memory access for a first processor. The system includes a first processor and a local memory. The local memory is coupled to the first processor. A first direct memory access controller (DMAC) is coupled to the first processor and the local memory. A system memory is in communication with the first DMAC. A second processor is in communication with the first DMAC such that the second processor sets up the first DMAC to handle data transfer between the local memory and the system memory. The second processor is interrupted when the first DMAC finishes handling the data transfer.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION

In the following discussion, numerous specific details are set forth to provide a thorough understanding of the present invention. However, it will be obvious to those skilled in the art that the present invention may be practiced without such specific details. In other instances, well-known elements have been illustrated in schematic or block diagram form in order not to obscure the present invention in unnecessary detail.

It is further noted that, unless indicated otherwise, all functions described herein may be performed in either hardware or software, or some combination thereof. In a preferred embodiment, however, the functions are performed by a processor such as a computer or an electronic data processor in accordance with code such as computer program code, software, and/or integrated circuits that are coded to perform such functions, unless indicated otherwise.

Figure 1:
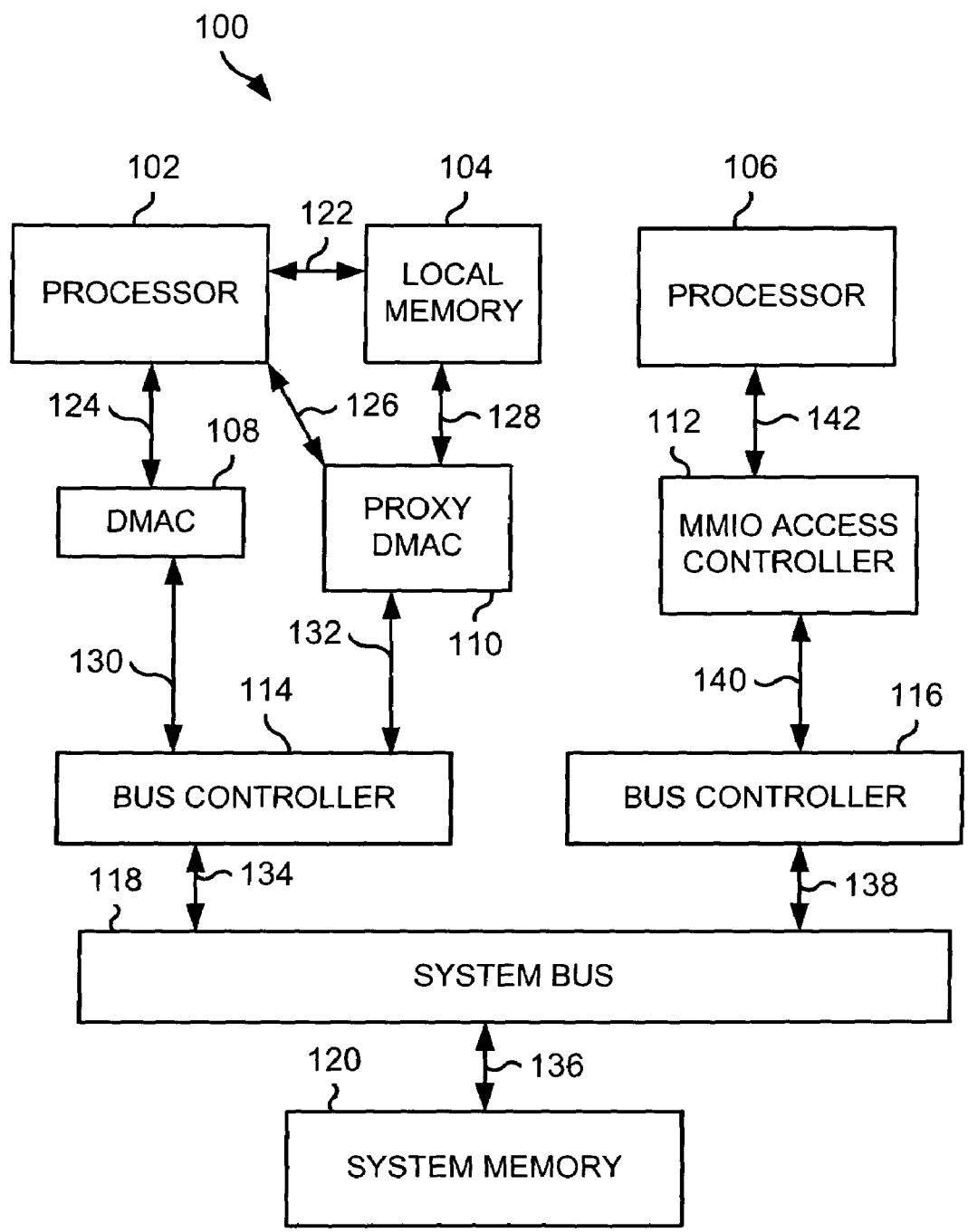
FIG. 1 is a block diagram illustrating a computer system adopting a proxy direct memory access (DMA)

Referring to FIG. 1 of the drawings, the reference numeral 100 generally designates a computer system. The computer system 100 comprises a first processor 102, a local memory 104, a second processor 106, a direct memory access controller (DMAC) 108, a proxy DMAC 110, a memory map input output (MMIO) access controller 112, a first bus controller 114, a second bus controller 116, a system bus 118, and a system memory 120. The MMIO access controller 112 is also known as a non-cacheable unit in the art.

The first processor 102 is coupled to the local memory 104 via a connection 122. The first processor 102 is also coupled to the DMAC 108 via a connection 124. The first processor 102 is also coupled to the proxy DMAC 110 via a connection 126. The local memory is coupled to the proxy DMAC via a connection 128.

The DMAC is coupled to the first bus controller 114 via a connection 130. The proxy DMAC 110 is coupled to the first bus controller 114 via a connection 132. The first bus controller 114 is coupled to the system bus 118 via a connection 134. The system bus 118 is coupled to the system memory 120 via a connection 136. The system bus 118 is coupled to the second bus controller 116 via a connection 138. The second bus controller 116 is coupled to the MMIO access controller 112 via a connection 140. The MMIO access controller 112 is coupled to the second processor 106 via a connection 142.

Preferably, the first processor 102 is a special processor, whereas the second processor 106 is a general-purpose processor. Also, the computer system 100 may be generalized to have a plurality of general-purpose processors. In that case, an additional cache (not shown) and an additional bus controller (not shown) may be coupled between each additional processor (not shown) and the system bus 118 in a manner similar to the connection between the second processor 106 and the system bus 118.

The first processor 102 is configured to specifically work with the local memory 104. In other words, the local memory 104 is dedicated to the first processor 102. Note that the local memory 104 is an example of a working memory space of the first processor 102. Therefore, different configurations of such a working memory space may be used for the first processor 102 without departing from the true spirit of the present invention. For example, such a working memory space may comprise a plurality of local memories.

Preferably, the first processor 102 is a special processor that primarily or exclusively performs special tasks with the help of the local memory 104. When the first processor 102 needs to access certain data to perform one of the special tasks, in one situation, the data may not be available from the local memory 104 but from the system memory 120. In another situation, the first processor 102 has just performed a special task and has to store certain output data in the local memory 104. Sometimes, this output data should be transmitted to the system memory 120 in order to make the data available to other processors, such as the second processor 106.

In these and other applicable situations, the second processor 106 is configured to set up the proxy DMAC 110 to perform the data transfer between the local memory 104 and the system memory 120. By this configuration, the first processor 102 does not have to spend any of its time in setting up the DMAC 108 for such data transfer between the local memory 104 and the system memory 120.

The second processor 106 loads a load signal (not shown) from the proxy DMAC 110 to determine whether the proxy DMAC 110 is ready to be set up for the first processor 102. Preferably, the second processor 106 analyzes the load signal to make the determination. Specifically, the proxy DMAC 110 transmits the load signal to the first bus controller 114 via the connection 132. The first bus controller 114 transmits the load signal to the system bus 118 via the connection 134. The system bus 118 transmits the load signal to the second bus controller 116 via the connection 138. The second bus controller 116 transmits the load signal to the second processor 106 either directly or through the MMIO access controller 142.

If it is determined that the proxy DMAC 110 is ready to be set up for the first processor 102, the first processor 102 sets up the proxy DMAC 110 by sending an access request (not shown) to the proxy DMAC 110. Specifically, the second processor 106 transmits the access request to the MMIO access controller 112 via the connection 142. The MMIO access controller 112 transmits the access request to the second bus controller 116 via the connection 140. Optionally, the MMIO access controller 112 may be skipped. The second bus controller 116 then transmits the access request to the system bus 118 via the connection 138. The system bus transmits the access request to the first bus controller 114 via the connection 134. The first bus controller 114 then transmits the access request to the proxy DMAC 110 via the connection 132.

Once the proxy DMAC 110 receives the access request, the proxy DMAC 110 is set up to handle any data transfer between the local memory 104 and the system memory 120 without interrupting the first processor 102 or the second processor 106.

When the first processor 102 requests data transfer from the system memory 120 to the local memory 104, the proxy DMAC 110 sends a data transfer request (not shown) to the system memory 120. In response to the data transfer request, the system memory 120 sends requested data back to the proxy DMAC 110. The proxy DMAC 110 then sends the requested data to the local memory 104. Specifically, the proxy DMAC 110 first transmits the data transfer request to the first bus controller 114 via the connection 132. The first bus controller 114 then transmits the data transfer request to the system bus 118 via the connection 134. The system bus 134 then transmits the data transfer request to the system memory 120 via the connection 136. In response to the data transfer request, the system memory 120 transmits the requested data first to the system bus 118 via the connection 136. The system bus 118 then transmits the requested data to the first bus controller 114 via the connection 134. The first bus controller 114 then transmits the requested data to the proxy DMAC 110 via the connection 132. The proxy DMAC 110 then transmits the requested data to the local memory 104.

When the requested data is stored in the local memory 104, the proxy DMAC 110 notifies the first processor that the data transfer is complete, preferably by sending a signal to the first processor 102 via the connection 126. Upon being notified of the completion of the data transfer, the first processor 102 accesses the local memory 104 to perform certain tasks on the requested data and generates output data. Sometimes, this output data has to be made available to other processors (e.g., the second processor 106) than the first processor 102. In this situation, the output data has to be stored in the system memory 120 for such other processors to access the output data. This requires that the output data be copied or moved from the local memory 104 to the system memory 120. Therefore, the proxy DMAC 110 sends the output data from the local memory 104 to the system memory 120.

Generally, the proxy DMAC 110 sends the local memory 104 a data transfer request for the output data. In response to this data transfer request, the local memory 104 sends the output data to the proxy DMAC 110. The proxy DMAC 110 then sends the output data to the system memory 120. Specifically, the proxy DMAC 110 transmits the output data first to the first bus controller 114 via the connection 132. The first bus controller 114 then transmits the output data to the system bus 118 via the connection 134. The system bus 118 then transmits the output data to the system memory 120 via the connection 136.

Optionally, the first processor 102 may be able to set up the DMAC 108 on some occasions without the help of the second processor 106. On such occasions, the DMAC 108 may be directly coupled to the local memory 104 via a connection (not shown) to handle the data transfer between the local memory 104 and the system memory 120 once the DMAC 108 is set up.

In an alternative embodiment, the DMAC 108 and the proxy DMAC 110 may be put together within a combined DMAC (not shown) such that the combined DMAC contains both the DMAC 108 and the proxy DMAC 110. In this manner, a single connection (not shown) may be used between the combined DMAC and the local memory 104. Similarly, a single connection (not shown) may be used between the combined DMAC and the first bus controller 114. In this alternative embodiment, either the first processor 102 or the second processor 106 may set up the combined DMAC depending on the availability of the first processor 102 and overall performance of the computer system 100.

In another alternative embodiment, the proxy DMAC 110 may be configured to be set up by either the first processor 102 or the second processor 106, depending on the availability of the first processor 102 and overall performance of the computer system 100. In this alternative embodiment, the DMAC 108 is not used.

Figure 2:
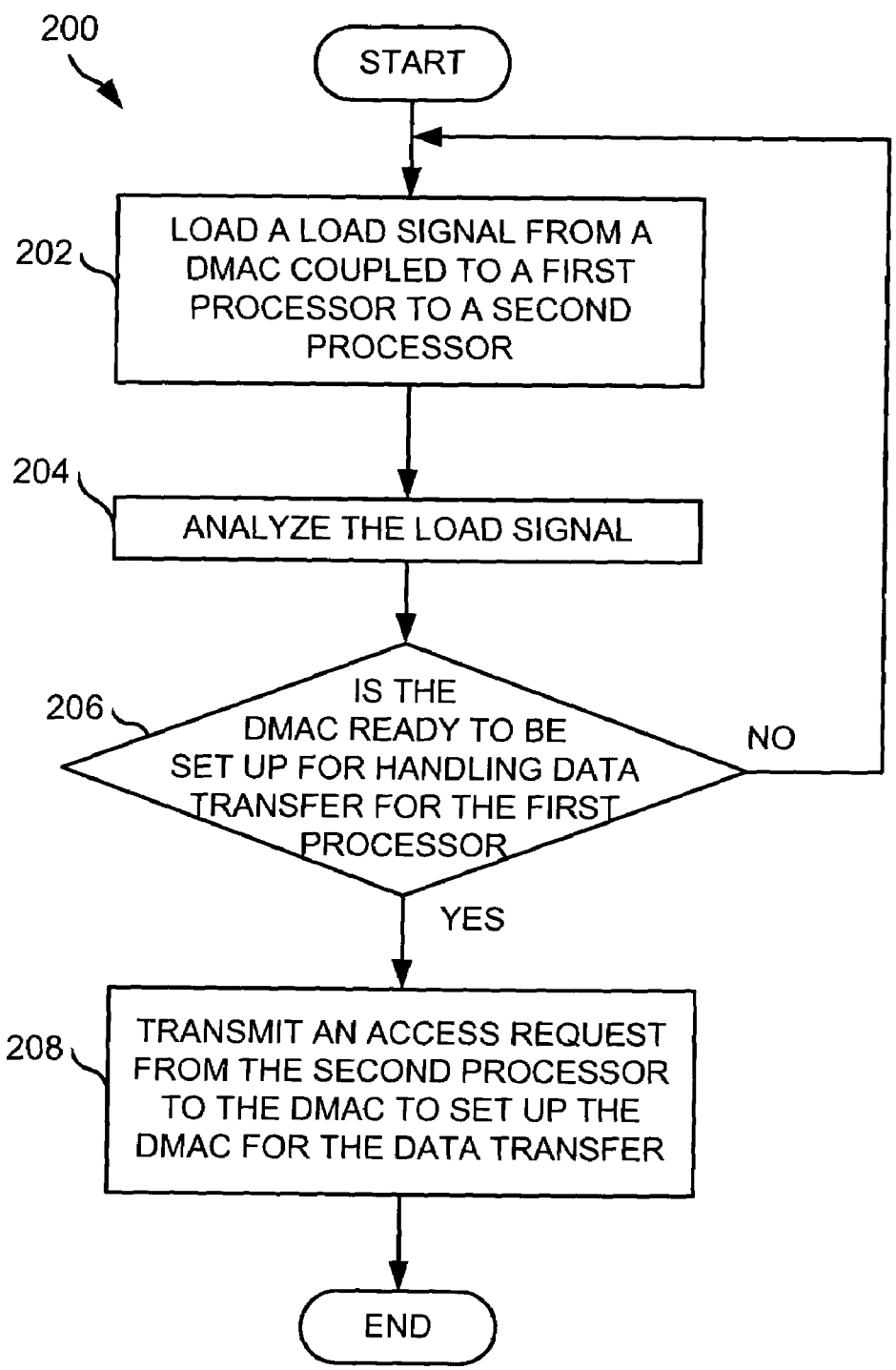
FIG. 2 is a flow diagram illustrating the operation of the computer system of FIG. 1.

Now referring to FIG. 2, a flow diagram 200 is shown to illustrate the operation of the computer system 100 of FIG. 1. In step 202, a load signal is loaded from a DMAC coupled to a first processor to a second processor. Preferably, the load signal is loaded from the proxy DMAC 110 coupled to the first processor 102 to the second processor 106.

In step 204, the load signal is analyzed. Preferably, the second processor 106 analyzes the load signal. In step 206, it is determined whether the DMAC is ready to be set up for handling data transfer for the first processor. Preferably, the second processor 106 determines whether the proxy DMAC 110 is ready to be set up for handling data transfer for the first processor 102 between the local memory 104 and the system memory 120. If it is determined in step 204 that the DMAC is not ready to be set up for handling data transfer for the first processor, the routine goes to step 202.

In step 208, upon a determination that the DMAC is ready to be set up for handling data transfer for the first processor, an access request is transmitted from the second processor to the DMAC to set up the DMAC for the data transfer. Preferably, the access request is transmitted from the second processor 106 to the proxy DMAC 110 to set up the proxy DMAC 110 for the data transfer between the local memory 104 and the system memory 120.

It will be understood from the foregoing description that various modifications and changes may be made in the preferred embodiment of the present invention without departing from its true spirit. This description is intended for purposes of illustration only and should not be construed in a limiting sense. The scope of this invention should be limited only by the language of the following claims.

The invention claimed is:

1. A method for setting up a direct memory access for a first processor having a local memory, the method comprising the steps of:
   determining whether a first DMAC is ready to be set up for handling data transfer for the first processor;
   upon a determination that the first DMAC is ready to be set up for handling the data transfer for the first processor, transmitting an access request from a second processor to the first DMAC to set up the first DMAC for data transfer between the local memory and a system memory; and
   interrupting the second processor when the first DMAC finishes handling the data transfer;
   wherein the step of transmitting the access request from the second processor to the first DMAC to set up the first DMAC for the data transfer comprises the steps of:
   transmitting the access request from the second processor to a first bus controller;
   transmitting the access request from the first bus controller to a system bus;
   transmitting the access request from the system bus to a second bus controller; and
   transmitting the access request from the second bus controller to the first DMAC.

2. The method of claim 1, wherein the step of transmitting the access request from the second processor to a first bus controller comprises the steps of:
   transmitting the access request from the second processor to a non-cacheable unit; and
   transmitting the access request from the non-cacheable unit to the first bus controller.

3. The method of claim 2, wherein the non-cacheable unit is a memory map input output (MMIO) access controller.

4. The method of claim 1, wherein the first processor is configured to poll the first DMAC and to interrupt the second processor when the first DMAC completes the data transfer.

5. The method of claim 1, further comprising a second DMAC in communication with the local memory, the system memory, and the first processor, wherein the second processor is configured to set up the second DMAC to handle at least a portion of the data transfer between the local memory and the system memory.

6. The method of claim 1, wherein the first DMAC is also in communication with the first processor, and wherein the first processor is configured to set up the first DMAC to handle the data transfer between the local memory and the system memory.

7. The method of claim 1, wherein the first DMAC is a proxy DMAC.

8. A method for setting up a direct memory access for a first processor having a local memory, the method comprising the steps of:
   determining whether a first DMAC is ready to be set up for handling data transfer for the first processor;
   upon a determination that the first DMAC is ready to be set up for handling the data transfer for the first processor, transmitting an access request from a second processor to the first DMAC to set up the first DMAC for data transfer between the local memory and a system memory; and
   interrupting the second processor when the first DMAC finishes handling the data transfer;
   wherein the step of determining whether the first DMAC is ready to be set up for handling data transfer for the first processor comprises the steps of:
   loading a load signal from the first DMAC to the second processor;
   analyzing the load signal; and
   determining whether the first DMAC is ready to be set up for handling data transfer for the first processor;
   wherein the step of loading a load signal from the first DMAC to the second processor comprises the steps of:
   transmitting the load signal from the first DMAC to a first bus controller;
   transmitting the load signal from the first bus controller to a system bus;
   transmitting the load signal from the system bus to a second bus controller;
   transmitting the load signal from the second bus controller to the second processor; and
   loading the load signal to the second processor;
   wherein the step of transmitting the load signal from the second bus controller to the second processor comprises the steps of:
   transmitting the load signal from the second bus controller to a non-cacheable unit; and
   transmitting the load signal from the non-cacheable unit to the second processor; and wherein the non-cacheable unit is a memory map input output (MMIO) access controller.

9. A system for setting up a direct memory access for a first processor having a local memory, the system comprising:
   means for determining whether a first DMAC is ready to be set up for handling data transfer for the first processor;
   means for, upon a determination that the first DMAC is ready to be set up for handling the data transfer for the first processor, transmitting an access request from a second processor to the first DMAC to set up the first DMAC for data transfer between the local memory and a system memory; and
   means for interrupting the second processor when the first DMAC finishes handling the data transfer;
   wherein the means for transmitting the access request from the second processor to the first DMAC to set up the first DMAC for the data transfer comprises:
   means for transmitting the access request from the second processor to a first bus controller;
   means for transmitting the access request from the second bus controller to a system bus;

means for transmitting the access request from the system bus to a first bus controller; and
means for transmitting the access request from the first bus controller to the first DMAC.

10. The system of claim 9, wherein the means for transmitting the access request from the second processor to the second bus controller comprises:
means for transmitting the access request from the second processor to a non-cacheable unit; and
means for transmitting the access request from the non-cacheable unit to the second bus controller.

11. The system of claim 10, wherein the non-cacheable unit is a memory map input output (MMIO) access controller.

12. The system of claim 9, wherein the first processor is configured to poll the first DMAC and to interrupt the second processor when the first DMAC completes the data transfer.

13. The system of claim 9, further comprising a second DMAC in communication with the local memory, the system memory, and the first processor, wherein the first processor is configured to set up the second DMAC to handle at least a portion of the data transfer between the local memory and the system memory.

14. The system of claim 9, wherein the first DMAC is also in communication with the first processor, and wherein the first processor is configured to set up the first DMAC to handle the data transfer between the local memory and the system memory.

15. The system of claim 9, wherein the first DMAC is a proxy DMAC.

16. A system for setting up a direct memory access for a first processor having a local memory, the system comprising:
means for determining whether a first DMAC is ready to be set up for handling data transfer for the first processor;
means for, upon a determination that the first DMAC is ready to be set up for handling the data transfer for the first processor, transmitting an access request from a second processor to the first DMAC to set up the first DMAC for data transfer between the local memory and a system memory; and
means for interrupting the second processor when the first DMAC finishes handling the data transfer;
wherein the means for determining whether the first DMAC is ready to be set up for handling data transfer for the first processor comprises:
means for loading a load signal from the first DMAC to the second processor;
means for analyzing the load signal; and
means for determining whether the first DMAC is ready to be set up for handling data transfer for the first processor;
wherein the means for loading a load signal from the first DMAC to the second processor comprises:
means for transmitting the load signal from the first DMAC to a first bus controller;
means for transmitting the load signal from the first bus controller to a system bus;
means for transmitting the load signal from the system bus to a second bus controller;
means for transmitting the load signal from the second bus controller to the second processor; and
means for loading the load signal to the second processor;

wherein the means for transmitting the load signal from the second bus controller to the second processor comprises:
means for transmitting the load signal from the second bus controller to a non-cacheable unit; and
means for transmitting the load signal from the non-cacheable unit to the second processor; and
wherein the non-cacheable unit is a memory map input output (MMIO) access controller.

17. A computer program product for setting up a direct memory access for a first processor, the computer program product having a computer-readable medium with a computer program embodied thereon, the computer program comprising:
computer program code for determining whether a first DMAC is ready to be set up for handling data transfer for the first processor;
computer program code for, upon a determination that the first DMAC is ready to be set up for handling the data transfer for the first processor, transmitting an access request from a second processor to the first DMAC to set up the first DMAC for data transfer between the local memory and a system memory; and
computer program code for interrupting the second processor when the first DMAC finishes handling the data transfer;
wherein the computer program code for transmitting the access request from the second processor to the first DMAC to set up the first DMAC for the data transfer comprises:
computer program code for transmitting the access request from the second processor to a second bus controller;
computer program code for transmitting the access request from the second bus controller to a system bus;
computer program code for transmitting the access request from the system bus to a first bus controller; and
computer program code for transmitting the access request from the first bus controller to the first DMAC.

18. The computer program product of claim 17, wherein the computer program code for transmitting the access request from the second processor to a second bus controller comprises:
computer program code for transmitting the access request from the second processor to a non-cacheable unit; and
computer program code for transmitting the access request from the non-cacheable unit to the second bus controller.

19. The computer program product of claim 18, wherein the non-cacheable unit is a memory map input output (MMIO) access controller.

20. The computer program product of claim 17, further comprising computer program code for polling the first DMAC and interrupting the second processor when the first DMAC completes the data transfer.

21. The computer program product of claim 17, further comprising a second DMAC in communication with the local memory, the system memory, and the first processor, the first processor further comprising computer program code to set up the second DMAC to handle at least a portion of the data transfer between the local memory and the system memory.

22. The computer program product of claim 17, wherein the first DMAC is also in communication with the first processor, the first processor further comprising computer program code to set up the first DMAC to handle the data transfer between the local memory and the system memory.

23. The computer program product of claim 17, wherein the first DMAC is a proxy DMAC.

24. A computer program product for setting up a direct memory access for a first processor, the computer program product having a medium with a computer program embodied thereon, the computer program comprising:
  computer program code for determining whether a first DMAC is ready to be set up for handling data transfer for the first processor;
  computer program code for, upon a determination that the first DMAC is ready to be set up for handling the data transfer for the first processor, transmitting an access request from a second processor to the first DMAC to set up the first DMAC for data transfer between the local memory and a system memory; and
  computer program code for interrupting the second processor when the first DMAC finishes handling the data transfer;
  wherein the computer program code for determining whether the first DMAC is ready to be set up for handling data transfer for the first processor comprises:
    computer program code for loading a load signal from the first DMAC to the second processor;
    computer program code for analyzing the load signal; and
    computer program code for determining whether the first DMAC is ready to be set up for handling data transfer for the first processor;
  wherein the computer program code for loading a load signal from the first DMAC to the second processor comprises:
    computer program code for transmitting the load signal from the first DMAC to a first bus controller;
    computer program code for transmitting the load signal from the first bus controller to a system bus;
    computer program code for transmitting the load signal from the system bus to a second bus controller;
    computer program code for transmitting the load signal from the second bus controller to the second processor; and
    computer program code for loading the load signal to the second processor;
  wherein the computer program code for transmitting the load signal from the second bus controller to the second processor comprises:
    computer program code for transmitting the load signal from the second bus controller to a non-cacheable unit; and
    computer program code for transmitting the load signal from the non-cacheable unit to the second processor; and
  wherein the non-cacheable unit is a memory map input output (MMIO) access controller.

* * * * *